United States Patent
Ichikawa

(10) Patent No.: US 10,072,809 B2
(45) Date of Patent: Sep. 11, 2018

(54) LIGHTING CIRCUIT AND VEHICLE LIGHTING DEVICE

(71) Applicant: KOITO MANUFACTURING CO., LTD., Tokyo (JP)

(72) Inventor: Tomoyuki Ichikawa, Shizuoka (JP)

(73) Assignee: KOITO MANUFACTURING CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/875,380

(22) Filed: Jan. 19, 2018

(65) Prior Publication Data

US 2018/0209605 A1 Jul. 26, 2018

(30) Foreign Application Priority Data

Jan. 23, 2017 (JP) ................. 2017-009768

(51) Int. Cl.
*F21S 41/663* (2018.01)
*H05B 33/08* (2006.01)
*B60Q 1/00* (2006.01)

(52) U.S. Cl.
CPC .......... *F21S 41/663* (2018.01); *B60Q 1/0094* (2013.01); *H05B 33/0842* (2013.01)

(58) Field of Classification Search
CPC .... H05B 37/03; H05B 37/02; H05B 37/0209; H05B 33/0815; H05B 33/0818; H05B 33/0842; H05B 33/0806; H05B 33/0809; H05B 33/0845; B60Q 1/1415; B06Q 1/1423; B06Q 11/005; B06Q 2300/146; B06Q 2300/45; Y02B 20/346; H02M 3/156; H01S 5/06825
See application file for complete search history.

(56) References Cited

U.S. PATENT DOCUMENTS

| | | | |
|---|---|---|---|
| 7,888,876 B2 * | 2/2011 | Kitagawa | B60Q 1/1423 315/185 R |
| 9,096,169 B2 * | 8/2015 | Ohmura | H02M 1/44 |
| 9,180,809 B2 * | 11/2015 | Tsuchiya | B60Q 1/2696 |
| 9,531,157 B2 * | 12/2016 | Ichikawa | H05B 33/0815 |
| 9,907,151 B2 * | 2/2018 | Ichikawa | H05B 37/03 |

FOREIGN PATENT DOCUMENTS

JP 2011-233305 A 11/2011

* cited by examiner

*Primary Examiner* — Haissa Philogene
(74) *Attorney, Agent, or Firm* — Sughrue Mion, PLLC

(57) ABSTRACT

A lighting circuit includes a control unit that selects one of an extinguishing mode and a plurality of lighting modes based on a first control signal and a second control signal, and a drive unit. The control unit is configured to i) select the extinguishing mode when at least one of the first control signal and the second control signal is a non-pulse signal, and ii) select one of the plurality of lighting modes based on the combination of the duty ratio of the first control signal and the duty ratio of the second control signal, when both the first control signal and the second control signal are pulse signals.

8 Claims, 7 Drawing Sheets

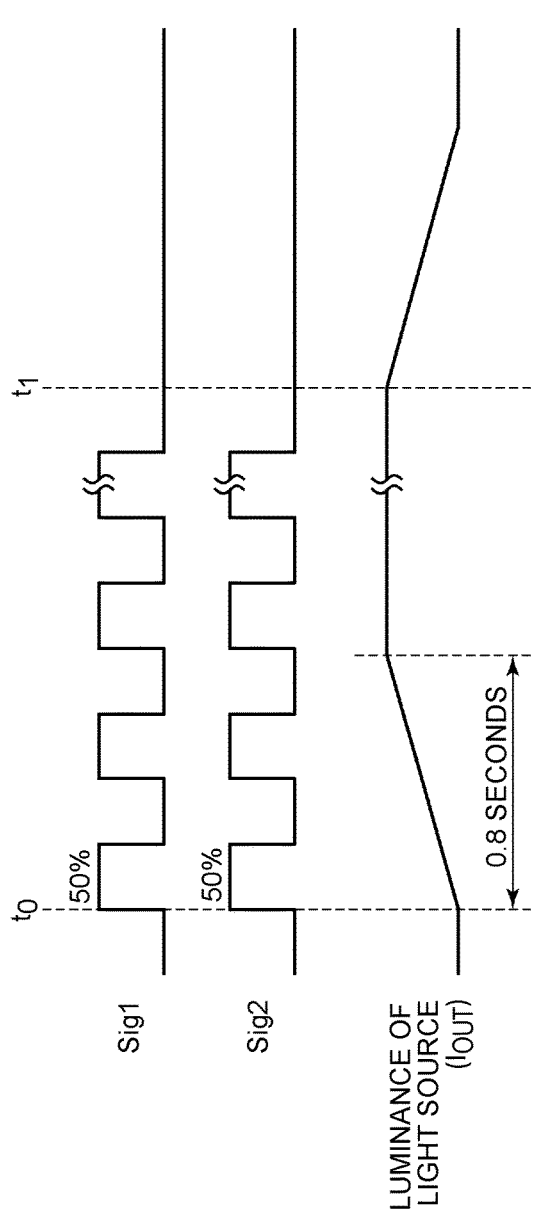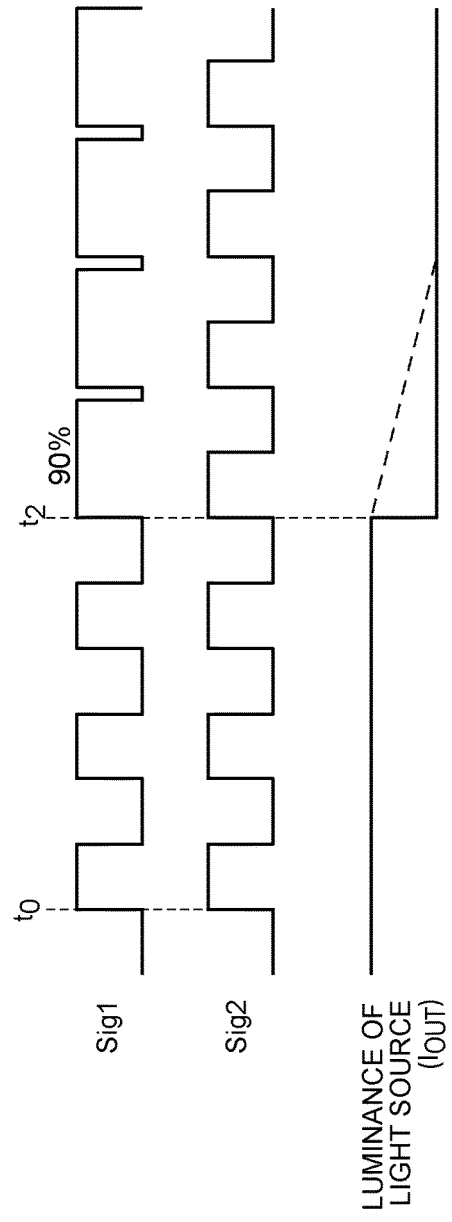

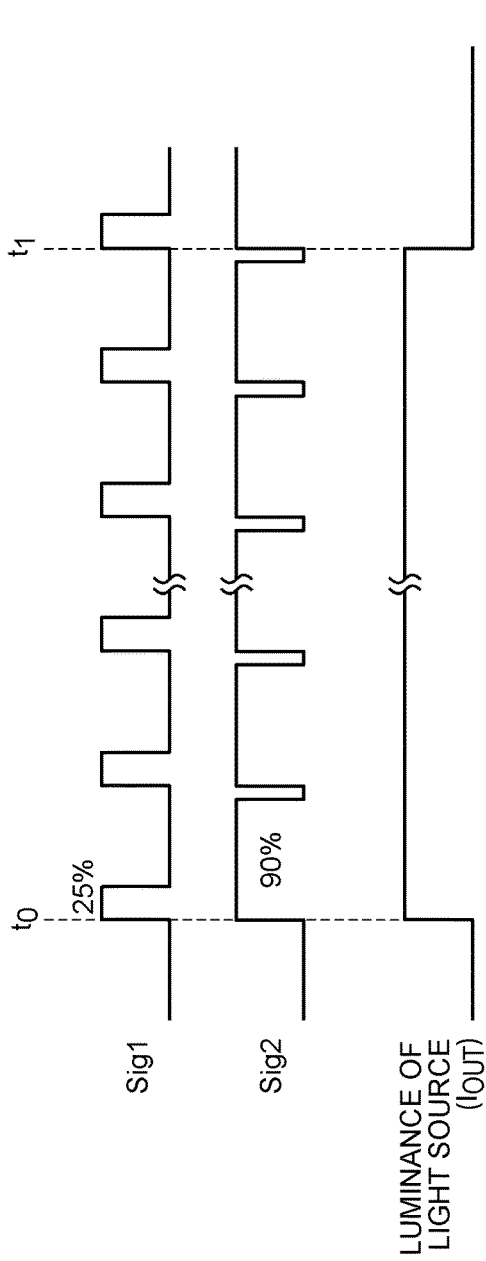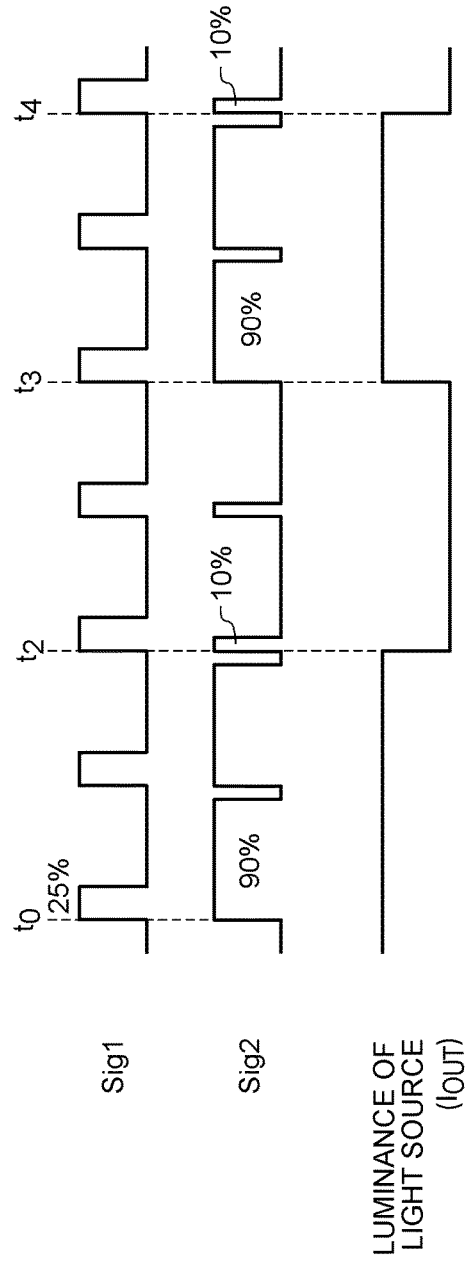

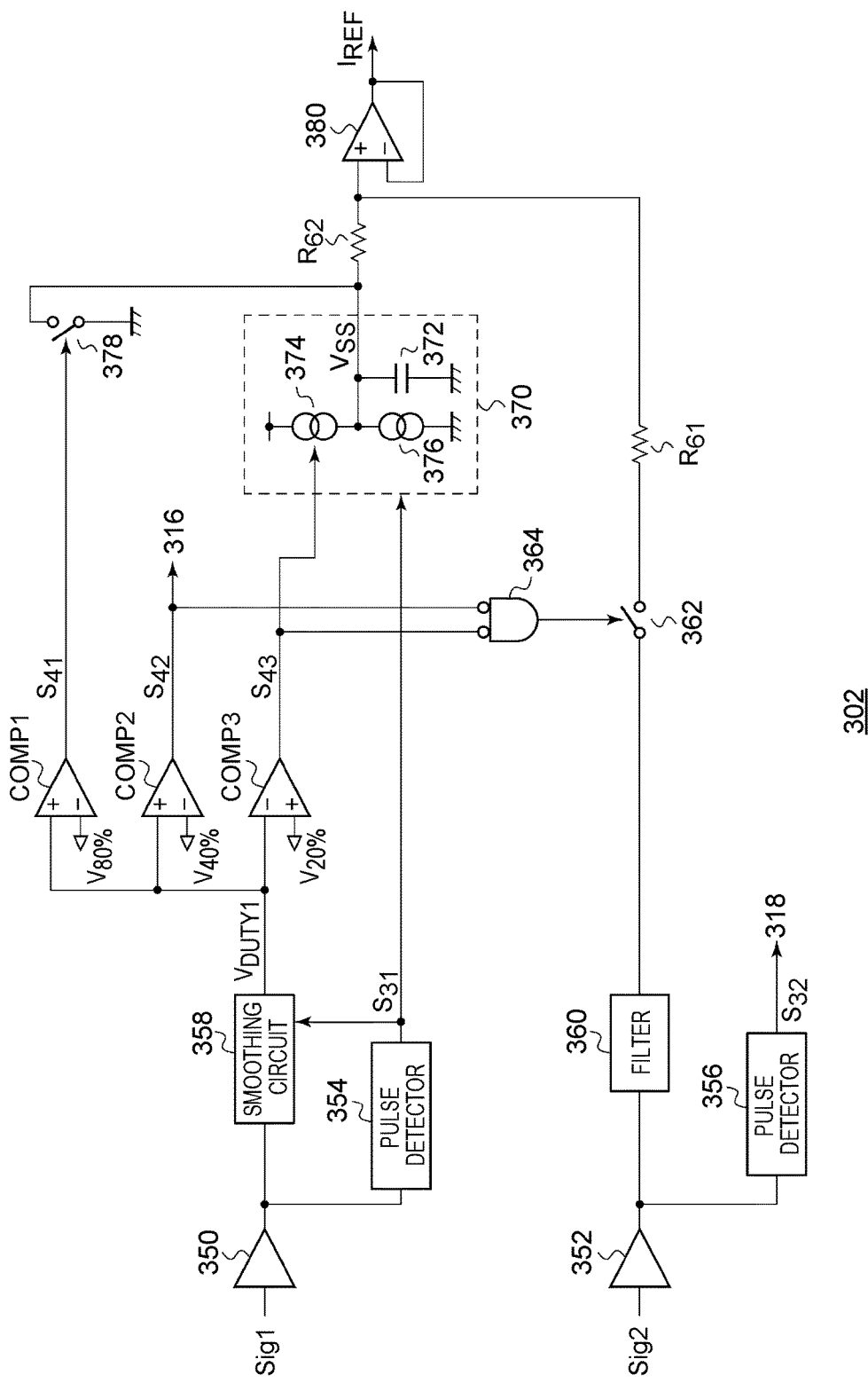

LIGHTING CIRCUIT AND VEHICLE LIGHTING DEVICE

INCORPORATION BY REFERENCE

The disclosure of Japanese Patent Application No. 2017-009768 filed on Jan. 23, 2017 including the specification, drawings and abstract is incorporated herein by reference in its entirety.

BACKGROUND

1. Technical Field

The disclosure relates to a lighting circuit and a vehicle lighting device.

2. Description of Related Art

In recent years, a high-luminance semiconductor light source such as an LD (laser diode) or an LED (light-emitting diode) has been used in a vehicle lighting device. By using a high-luminance light source, it is possible to form a light distribution pattern allowing visibility and safety to be increased.

FIG. 1A and FIG. 1B are diagrams showing exemplary light distribution patterns for which high-luminance light sources are used. By using a beam having a high directionality, as exemplified by laser, it is possible to brighten a distant local region 700. As a high-speed traveling, a distant illumination region 700 is illuminated in addition to an illumination region 702 for a low beam and an illumination region 704 for a high beam, and thereby, it is possible to increase visibility (referred to as a distant illumination high beam or an additional high beam).

FIG. 1B is a diagram showing another exemplary light distribution pattern for which a high-luminance light source is used. By using the high-luminance light source, it is possible to draw graphic information 712 such as figures or characters, on a road surface 710, at a higher illuminance than that in the illumination region 702 for the low beam (road surface marking). The graphic information 712 may notify a driver of the position of a pedestrian 720 for the sake of warning, or may inform the pedestrian 720 of approach of a vehicle. Alternatively, the graphic information 712 may trace a line along which the vehicle should travel, or may indicate a running direction at an intersection or a junction based on navigation information.

SUMMARY

The inventor has studied vehicle lighting devices with high functions, and as a result, has found the following problems.

For example, suppose that one vehicle lighting device can switch among a plurality of modes such as the additional high beam in FIG. 1A and the road surface marking in FIG. 1B. In this case, it is necessary to give information designating lighting or extinguishing and information designating a mode, to a lighting circuit of the light source. Further, when an operational state is changed in each mode, it is necessary to give information designating an operational state.

Generally, as control signals for the lighting circuit, signals with two values (for example, HIGH and LOW) are employed. When the number of lighting modes or operational states that are supported is increased due to the enhancement of the function of the vehicle lighting device, there is a problem in that the number of control signals increases and therefore the number of wires increases.

In addition, such a vehicle lighting device is required to have a further safety and reliability because of using a high-luminance light source. For example, when a laser or an optical system is abnormal, it is required to surely extinguish the laser. Suppose that a control signal is prepared for each mode and HIGH and LOW are assigned to ON and OFF respectively. When a control line to transmit a control signal corresponding to a certain mode is short-circuited with an electric power source, there is a concern that the laser cannot be extinguished.

The disclosure provides a lighting circuit that can increase a fail-safe function and that can switch among a plurality of lighting modes by a small number of control signals.

A lighting circuit for controlling a light source unit that is used in a vehicle lighting device according to a first aspect of the disclosure includes: a control unit configured to receive a first control signal and a second control signal through two control lines and select one of an extinguishing mode and a plurality of lighting modes based on the first control signal and the second control signal; and a drive unit configured to drive the light source unit in accordance with the mode selected by the control unit. The control unit is configured to i) select the extinguishing mode when at least one of the first control signal and the second control signal is a non-pulse signal, and ii) select one of the plurality of lighting modes based on the combination of the duty ratio of the first control signal and the duty ratio of the second control signal, when both the first control signal and the second control signal are pulse signals.

According to the aspect, it is possible to select a plurality of modes by the two control lines, regardless of the number of lighting modes. Further, since the vehicle lighting device is extinguished when at least one of the first control signal and the second control signal is a non-pulse signal, it is possible to increase the safety against a ground fault, a short-circuit with an electric power source and other abnormities.

In the above aspect, the control unit may be configured to select a first lighting mode when the duty ratio of the first control signal is contained in a first range, and select a second lighting mode when the duty ratio of the first control signal is contained in a second range. In this case, it is possible to use the duty ratio of the second control signal, for a control (a control of setting of an operational parameter or the like) other than the control of the lighting mode.

In the above configuration, the light source unit may include a light source and an actuator, and the state of the actuator may be different between the first lighting mode and the second lighting mode. The actuator may be used for changing the position of a shade that blocks a part of a beam, or changing the orientation of an optical axis.

In the above configuration, in the second lighting mode, the light source may be lighted when the duty ratio of the second control signal is contained in a first range, and the light source may be extinguished when the duty ratio of the second control signal is contained in a second range. In the second lighting mode, it is possible to blink the light source by altering the duty ratio of the second control signal between the first range and the second range alternately.

In the above configuration, in the first lighting mode, the drive unit may be configured to gradually light or gradually extinguish the light source, and the drive unit may be configured to instantly extinguish the light source when the duty ratio of the first control signal is contained in a third range adjacent to the first range. Thereby, it is possible to instantly extinguish the light source, without gradually extinguishing the light source.

In the above configuration, the plurality of lighting modes may include a third lighting mode, and the control unit may be configured to select the third lighting mode when the duty ratio of the first control signal is contained in a fourth range.

In the case where the first lighting mode and the second lighting mode are permitted only when the vehicle speed is equal to or higher than a predetermined value, there is a problem in that it is not possible to light the light source during the stop of the vehicle for the sake of maintenance or the like. In such a case, the maintenance can be performed by preparing the third lighting mode.

The drive unit may be configured to light the light source in the third lighting mode, at a lower speed than in the first lighting mode. There is a response lag in detection of an abnormity of the light source. In the third lighting mode, by reducing the increasing rate of the luminance of the light source, it is possible to reduce the increasing quantity of the luminance during the response lag, and therefore, in the case of the abnormity, it is possible to extinguish the light source from a lower luminance.

In the above aspect, the drive unit may include a switching converter that supplies a drive current to the light source of the light source unit and a protective switch that is provided on a pathway of the drive current, and the control unit may be configured to change a command value of the drive current and extinguish the light source when the first control signal is a non-pulse signal, and turn the protective switch off when the second control signal is a non-pulse signal.

A vehicle lighting device according to a second aspect of the disclosure includes a light source unit that includes a light source, and the lighting circuit in the first aspect, the lighting circuit driving the light source unit.

An arbitrary combination of the above-described constituent elements or an aspect in which constituent elements or expressions of the disclosure are mutually replaced among a method, an apparatus and a system is effective as an aspect of the disclosure.

Furthermore, in the description in this section, all indispensable characteristics of the invention are not explained, and therefore, sub-combinations of the described characteristics can be included in the invention.

According to an aspect of the disclosure, it is possible to provide a lighting circuit that can increase a fail-safe function and that can switch among a plurality of lighting modes by a small number of control signals.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5A is an operational waveform diagram in a first lighting mode of a vehicle lighting device in FIG. 2;

FIG. 5B is an operational waveform diagram in the first lighting mode of the vehicle lighting device in FIG. 2;

FIG. 6A is an operational waveform diagram in a second lighting mode of the vehicle lighting device in FIG. 2;

FIG. 6B is an operational waveform diagram in the second lighting mode of the vehicle lighting device in FIG. 2; and FIG. 7 is a block diagram showing a configuration example of a control unit.

DETAILED DESCRIPTION OF EMBODIMENTS

Figure 1A:
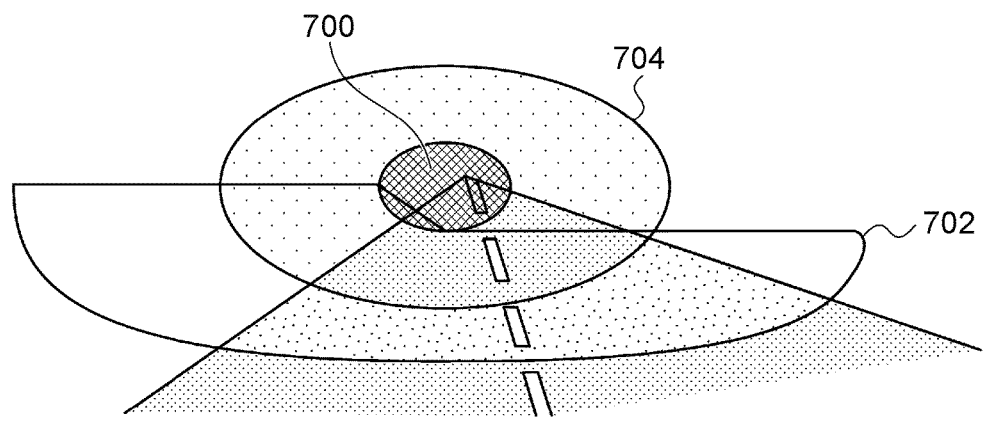
FIG. 1A is a diagram showing an exemplary light distribution pattern for which a high-luminance light source is used.

Hereinafter, the disclosure will be described based on a preferred embodiment, with reference to the drawings. Identical reference characters are assigned to identical or equivalent constituent elements, members and processes shown in the drawings, and repetitive descriptions are appropriately omitted. The embodiment is an example, and does not limit the disclosure, and all characteristics described in the embodiment and combinations of them are not always essential matters of the disclosure.

In the present specification, a "state where a member A is connected to a member B" includes a case where the member A and the member B are connected physically and directly, as well as a case where the member A and the member B are connected indirectly through another member that has no substantial influence on the electric connection state of the member A and the member B or that does not impair functions and effects to be exerted by the coupling of the member A and the member B.

Similarly, a "state where a member C is provided between a member A and a member B" includes a case where the member A or member B and the member C are connected directly, as well as a case where the member A or member B and the member C are connected indirectly through another member that has no substantial influence on the electric connection state of the member A or member B and the member C or that does not impair functions and effects to be exerted by the coupling of the member A or member B and the member C.

In the present specification, reference characters assigned to electric signals such as voltage signals and current signals and circuit elements such as resistors and capacitors, as necessary, indicate voltage values, current values, resistance values and capacitance values.

In the present specification, ordinates and abscissas of referenced waveforms diagrams and timing charts are appropriately scaled up or scaled down, to facilitate understanding, and drawn waveforms are simplified, exaggerated or emphasized, to facilitate understanding.

Figure 1B:
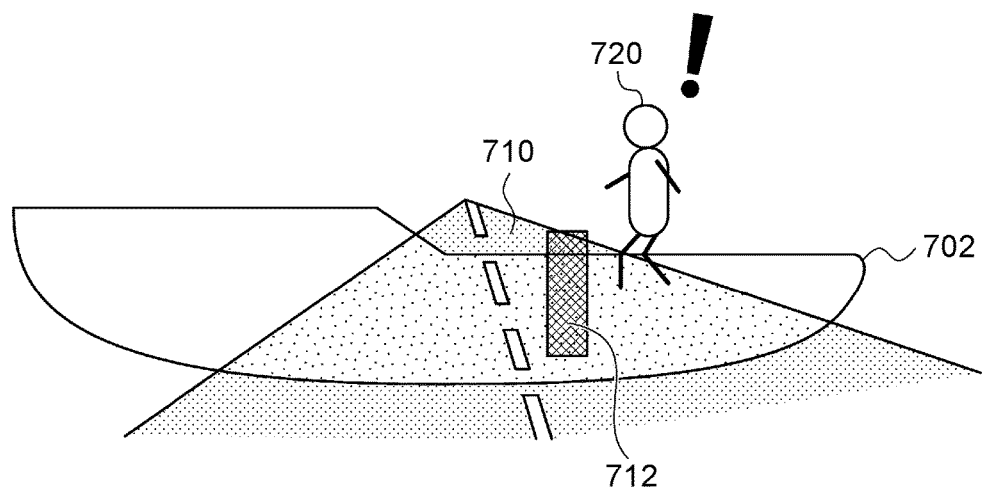
FIG. 1B is a diagram showing an exemplary light distribution pattern for which a high-luminance light source is used.
Figure 2:
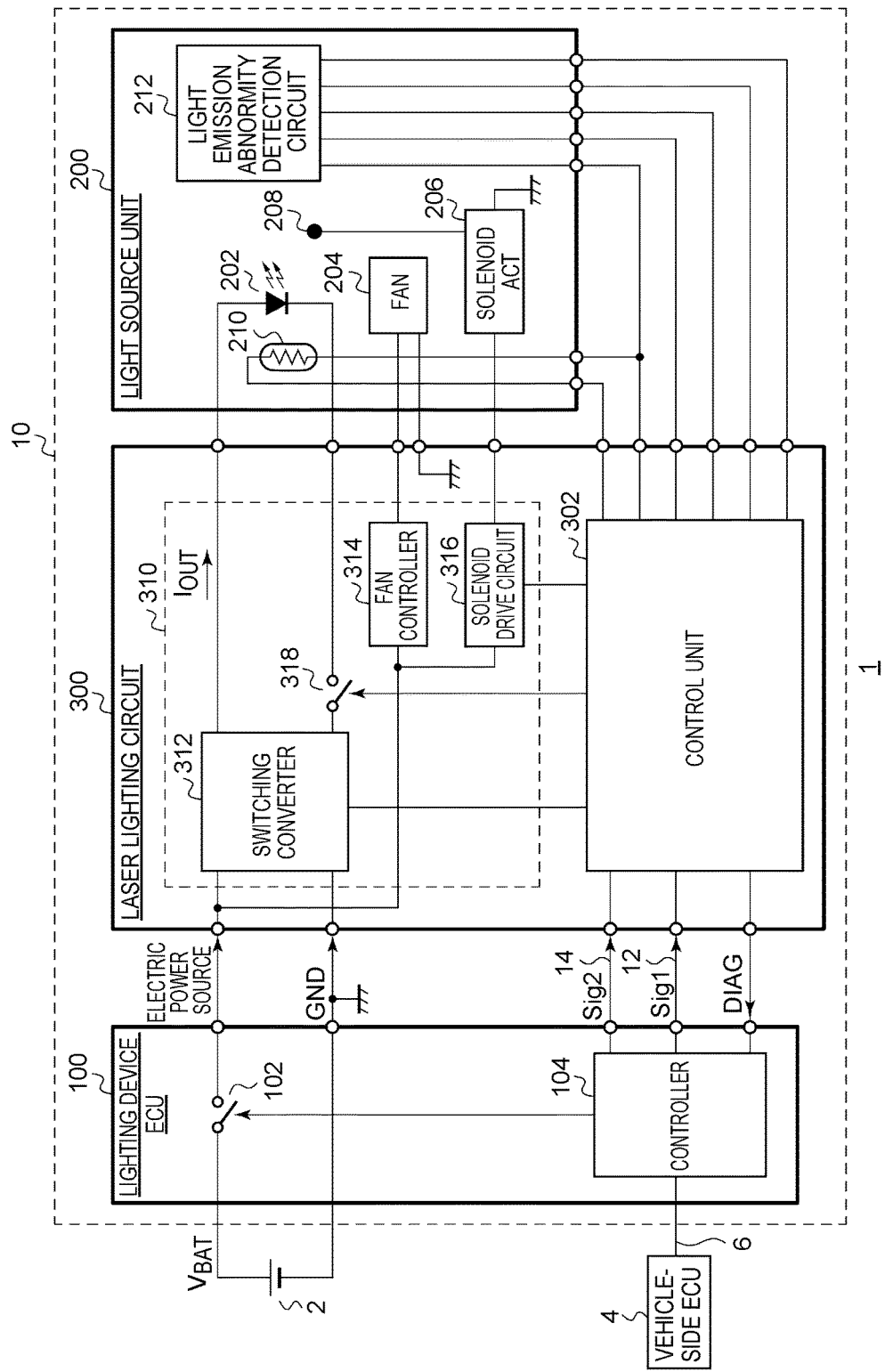
FIG. 2 is a block diagram of a lighting system according to an embodiment.

FIG. 2 is a block diagram of a lighting system according to an embodiment. A lighting system 1 includes a battery 2, a vehicle-side ECU (Electronic Control Unit) 4 and a vehicle lighting device 10. The vehicle lighting device 10 provides an additional high beam function and a road surface marking function that are shown in FIG. 1A and FIG. 1B. In FIG. 2, only functional blocks related to the functions are shown, and functional blocks related to a low beam and a high beam are omitted.

The vehicle lighting device 10 includes a lighting device ECU 100, a light source unit 200 and a lighting circuit 300. The lighting device ECU 100 mainly includes a switch 102 and a controller 104. The controller 104 is connected to the vehicle-side ECU 4 through a network 6 such as a CAN (Controller Area Network) or a LIN (Local Interconnect Network). The controller 104, which is a CPU, a microcontroller or the like, receives lighting-extinguishing instruction, vehicle speed information, camera information and the like from the vehicle-side ECU 4, and controls the switch 102 and a light source unit 200 based on the received signals.

The switch 102 is provided on a supply pathway of a source voltage (battery voltage $V_{BAT}$) from a battery 2 to the lighting circuit 300. When the controller 104 receives an ON command from the vehicle-side ECU 4, the controller 104 turns the switch 102 on.

The light source unit 200 includes a light source 202, a cooling fan 204, an actuator 206, a slit 208, a temperature detection element 210, and a light emission abnormity detection circuit 212. The light source 202 is a semiconductor light source such as a laser diode or an LED. The cooling fan 204 cools the light source 202 by air. The temperature detection element 210 is a thermistor, a thermocouple or the like, and detects the temperature of the light source 202.

As described above, the lighting device ECU 100 supports a plurality of lighting modes. In the embodiment, lighting mode can be switched depending on the state of the actuator 206. For example, the actuator 206 is equipped with the slit 208, and the switching among the plurality of lighting modes may be performed depending on the position of the slit 208. Alternatively, the position or inclination of the light source 202, a lens, a mirror or the like of an unillustrated optical system may be controlled by the actuator 206, and thereby, the switching among the plurality of lighting modes may be performed.

The light emission abnormity detection circuit 212 detects an abnormity of the light source 202. For example, the light source 202 may be constituted by a blue laser and a white light source including a fluorescent substance. Emitted light of the blue laser enters the fluorescent substance, and is synthesized with yellow light generated by the fluorescent substance, so that white light is generated. In normal times, the blue laser light is scattered by the fluorescent substance, but there is a concern that the raw blue laser light is not scattered and is emitted with no change (referred to as a light leakage abnormity), due to the deviation of the fluorescent substance from an optical axis of the blue laser or an influence of aging degradation, so that the blue laser light dazzles peripheral persons. The light emission abnormity detection circuit 212 may monitor the light leakage abnormity. In addition, the light emission abnormity detection circuit 212 may detect an abnormity of an optical axis of the light source 202, and the like.

The lighting circuit 300 includes a control unit 302 and a drive unit 310. The control unit 302 controls the drive unit 310 based on control signals Sig1, Sig2 from the controller 104. The control unit 302 outputs a diagnostic signal DIAG indicating a diagnostic result (whether there is an abnormity) for the light source unit 200 or the lighting circuit 300, to the controller 104.

The drive unit 310 includes a switching converter 312, a fan controller 314, a solenoid drive circuit 316, and a protective switch 318. The switching converter 312 has a constant current output, and generates a drive current $I_{OUT}$ stabilized to a target current $I_{REF}$, to output the drive current $I_{OUT}$ to the light source 202. The fan controller 314 drives the cooling fan 204. For example, the actuator 206 is a solenoid actuator, and the solenoid drive circuit (actuator drive circuit) 316 drives the actuator 206. The protective switch 318 is provided on a pathway of the drive current $I_{OUT}$, and is turned off when the abnormity is detected.

Figure 3:
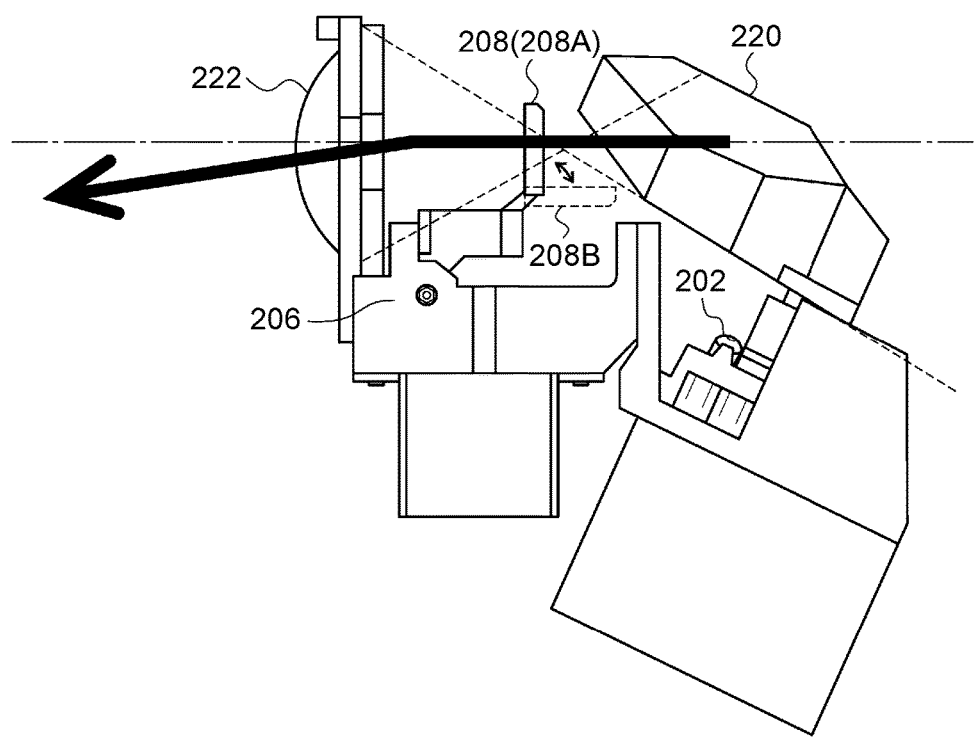
FIG. 3 is a sectional diagram showing a configuration example of a light source unit.

FIG. 3 is a sectional diagram showing a configuration example of the light source unit 200. A mirror 220 and a lens 222 reflect and condense emitted light of the light source 202, to regulate the diffusion angle of the emitted light, the optical axis and the like. The slit 208 is provided between the mirror 220 and the lens 222. The actuator 206 changes the position of the slit 208, between positions denoted by reference characters 208A, 208B in FIG. 3. For example, when the actuator 206 is in a non-energized state, the position of the slit 208 is the position 208A. At this time, reflected light from the mirror 220 passes through the slit 208, and thereby, a light distribution pattern suitable for the road surface marking is formed. When electric current is supplied to the solenoid of the actuator 206 (an energized state), the position of the slit 208 is changed to the position 208B, and the slit 208 does not act on the light, so that a light distribution for the distant illumination high beam is formed.

Refer to FIG. 2 again. Next, an interface between the control unit 302 and the controller 104 will be described. The control unit 302 receives a first control signal Sig1 and a second control signal Sig2 through two control lines 12, 14, and selects one of an extinguishing mode and a plurality of lighting modes based on the first control signal Sig1 and the second control signal Sig2. The drive unit 310 drives the light source unit 200 in accordance with the mode selected by the control unit 302.

Thereby, it is possible to select a plurality of modes by the two control lines 12, 14, regardless of the number of lighting modes.

The control unit 302 selects the extinguishing mode, when at least one of the first control signal Sig1 and the second control signal Sig2 is a non-pulse signal. In the extinguishing mode, the target current $I_{REF}$ of the switching converter 312 is set to zero, and the drive current $I_{OUT}$ becomes zero. In the extinguishing mode, the protective switch 318 may be turned off.

In the case where a pulse signal cannot be transmitted because the electric potential of at least one of the control lines 12, 14 is fixed, for example, due to a ground fault or short-circuit with the electric power source of the control lines 12, 14 or an abnormity of an output interface of the controller 104, it is guaranteed to necessarily select the extinguishing mode, and therefore, it is possible to turn the light source 202 off and to increase a fail-safe function.

When both the first control signal Sig1 and the second control signal Sig2 are pulse signals, the control unit 302 selects one of the plurality of lighting modes, based on the combination of the duty ratio of the first control signal Sig1 and the duty ratio of the second control signal Sig2. Frequencies of the first control signal Sig1 and the second control signal Sig2 may be constant, and may be about 200 Hz, for example.

The control unit 302 selects a first lighting mode MODE1 when the duty ratio of the first control signal Sig1 is contained in a first range (for example, 40 to 80%), and selects a second lighting mode MODE2 when the duty ratio of the first control signal Sig1 is contained in a second range (for example, 20 to 40%).

In the case where the state of the actuator 206 is changed depending on the lighting mode, the control unit 302 gives control commands different depending on the mode, to the solenoid drive circuit 316.

As an example, the first lighting mode is a distant illumination mode described with reference to FIG. 1A, and the second lighting mode is a road surface marking mode described with reference to FIG. 1B. In the following, this case will be described.

The duty ratio of the second control signal Sig2 can be used for the control of a parameter different from the lighting mode. For example, in the second lighting mode, the control unit 302 may supply the drive current $I_{OUT}$ to the light source 202, to light the light source 202, when the duty ratio of the second control signal Sig2 is contained in a first range (for example, 0 to 20%), and may adjust the drive current $I_{OUT}$ to zero, to extinguish the light source 202, when the duty ratio of the second control signal Sig2 is contained in a second range (for example, 80 to 100%). In the first lighting mode, the duty ratio of the second control signal Sig2 may be masked.

That is, in the second lighting mode (road surface marking mode), it is possible to blink the light source 202 by altering the duty ratio of the second control signal Sig2 between the first range and the second range alternately.

In the first lighting mode, the drive unit 310 may gradually light or gradually extinguish the light source 202. Specifically, when the drive unit 310 receives a lighting command, the drive unit 310 gently increases the drive current $I_{OUT}$ with time and gently increases the luminance. On the contrary, when the drive unit 310 receives an extinguishing command, the drive unit 310 gently decreases the drive current $I_{OUT}$ with time and gently decreases the luminance. It is possible to produce a high-grade sense by using the change in the luminance of the light source 202.

Furthermore, the drive unit 310 may instantly extinguish the light source 202, when the duty ratio of the first control signal Sig1 is contained in a third range (for example, 80 to 100%) adjacent to the first range. In the first lighting mode (distant illumination mode), for preventing the beam from dazzling preceding vehicles and oncoming vehicles, when a preceding vehicle is detected, it is required to instantly extinguish the light source 202 instead of gradually extinguish the light source 202. Hence, a partial range of the duty ratio of the first control signal Sig1 is assigned for the instant extinguishing, and thereby, it is possible to further increase the safety.

Furthermore, a third lighting mode MODE3 may be added, and the third lighting mode MODE3 may be selected when the duty ratio of the first control signal Sig1 is in a fourth range (for example, 0 to 20%).

The light source 202, because of having a high luminance, intensely dazzles peripheral persons, when emitting light during the stop of the vehicle (or during a low-speed traveling). Therefore, the controller 104 is designed to monitor the vehicle speed and to select the first lighting mode (distant illumination mode) or a second lighting mode (road surface marking mode) only when the vehicle speed is equal to or higher than a predetermined value. In this case, there is a problem in that it is not possible to light the light source 202 during the stop of the vehicle for the sake of maintenance or the like. Hence, the third lighting mode (also referred to as a maintenance mode) MODE3 in which the light source 202 can be lighted even during the stop of the vehicle may be prepared. Thereby, the maintenance can be performed.

As described above, in the first lighting mode MODE1, the drive unit 310 gradually lights the light source 202. In the third lighting mode MODE3, the drive unit 310 may light the light source 202 at a further lower speed than in the first lighting mode MODE1.

There is a response lag in the detection of the abnormity of the light source 202 by the light emission abnormity detection circuit 212. By reducing the increasing rate of the luminance of the light source, it is possible to reduce the increasing quantity of the luminance during the response lag, and therefore, in the case of the abnormity, it is possible to extinguish the light source from a lower luminance.

Figure 4:
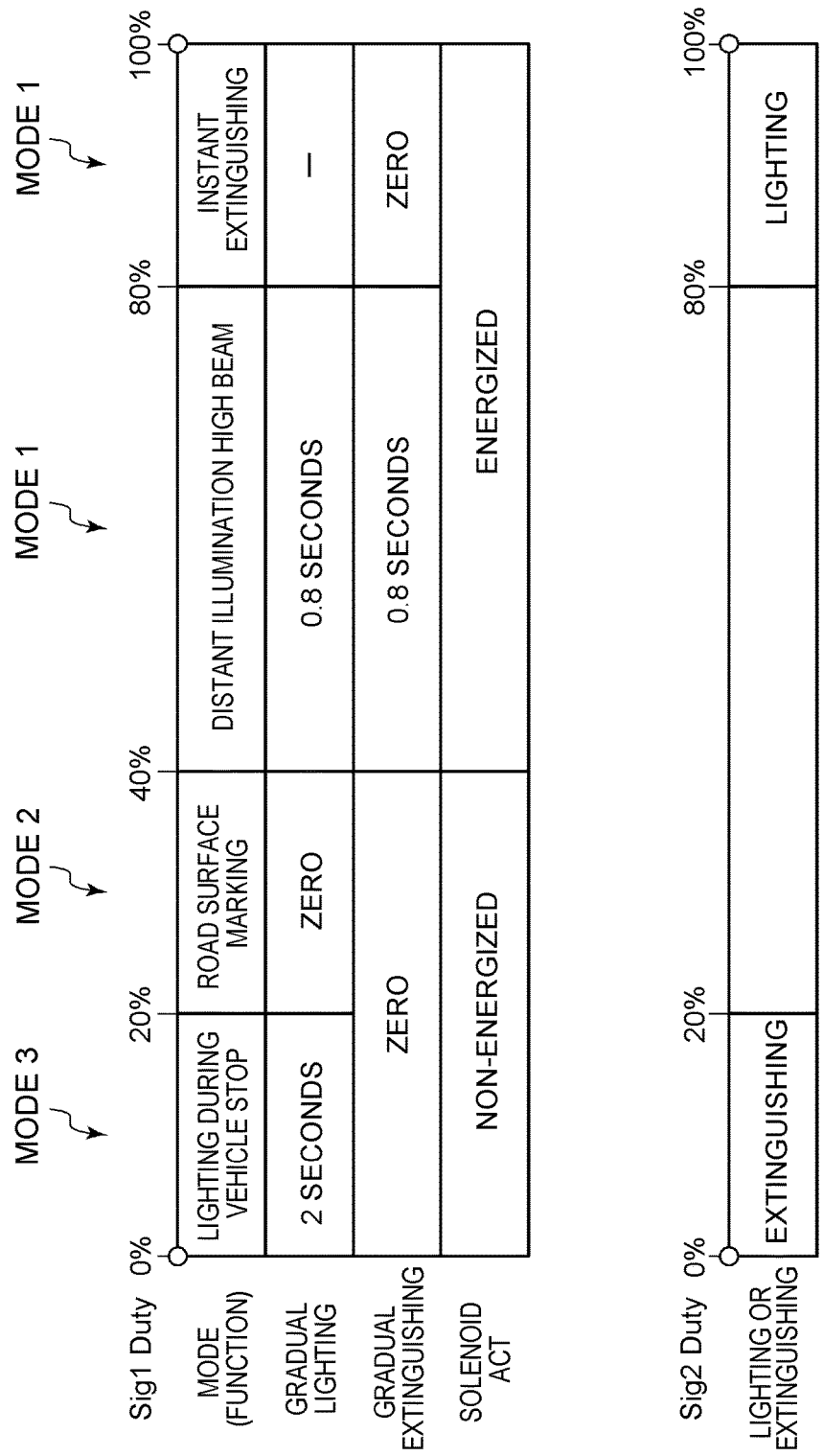
FIG. 4 is a diagram showing a correspondence relation of a first control signal, a second control signal and a plurality of modes or functions.

FIG. 4 is a diagram showing a correspondence relation of the first control signal Sig1, the second control signal Sig2, and the plurality of modes or functions.

FIG. 5A and FIG. 5B are operational waveform diagrams in the first lighting mode of the vehicle lighting device in FIG. 2. Refer to FIG. 5A. Before time $t_0$, the light source 202 is extinguished. When the first control signal Sig1 having a duty ratio of 50% and the second control signal Sig2 having a duty ratio of 50% are given at time $t_0$, the control unit 302 determines that the mode is the first lighting mode MODE1. At this time, the second control signal Sig2 only needs to be a non-pulse, and does not need to have a duty ratio of 80 to 100%. The switching converter 312 increases the drive current $I_{OUT}$ at a first rate (for example, a time constant of 0.8 seconds). Thereby, the light source 202 is slowly lighted (gradually lighted), a rapid change in brightness is suppressed, the driver and peripheral persons are prevented from being dazzled, and a high-grade sense is produced.

When at least one of the first control signal Sig1 and the second control signal Sig2 is changed to a non-pulse at time $t_1$, the control unit 302 determines that the mode is the extinguishing mode, and decreases the drive current $I_{OUT}$ at the first rate to gradually extinguish the light source 202.

Refer to FIG. 5B. Before time $t_2$, the light source unit 200 is lighted in the first lighting mode. When a vehicle in front is detected at time $t_2$, the duty ratio of the first control signal Sig1 is changed to 90%. In such a way, the control unit 302 adjusts the drive current $I_{OUT}$ of the switching converter 312 to zero in a shorter time than that in the gradual extinguishing. Thereby, it is possible to instantly extinguish the light source 202, and to prevent the vehicle in front from being dazzled.

FIG. 6A and FIG. 6B are operational waveform diagrams in the second lighting mode of the vehicle lighting device in FIG. 2. Refer to FIG. 6A. Before $t_0$, the light source 202 is extinguished. When the first control signal Sig1 having a duty ratio of 25% and the second control signal Sig2 having a duty ratio of 90% are given at time $t_0$, the control unit 302 determines that the mode is the second lighting mode MODE2. The switching converter 312 increases the drive current $I_{OUT}$ at a higher rate than the first rate (for example, a time constant of 0.8 seconds). Thereby, the light source 202 is instantly lighted, and appropriate graphic information is drawn on a road surface.

When at least one of the first control signal Sig1 and the second control signal Sig2 is changed to a non-pulse at time $t_1$, the control unit 302 determines that the mode is the extinguishing mode. Then, the drive current $I_{OUT}$ is decreased at a higher rate than the first rate, and the light source 202 is instantly extinguished.

Refer to FIG. 6B. Before time $t_2$, the light source unit 200 is lighted in the second lighting mode. After time $t_2$, the duty ratio of the second control signal Sig2 is changed between two values of 90% and 10%, with a predetermined blinking period (for example, 0.3 seconds). Thereby, it is possible to blink the light source 202.

For blinking the light source, it is conceivable that a pulse for blinking control is generated using an oscillator of the vehicle lighting device. However, in this method, a light source of a right lighting device and a light source of a left lighting device are asynchronously blinked. As described above, by superimposing control information for blinking on the second control signal Sig2, it is possible to synchronize the blinking operations of the right and left lighting devices.

FIG. 7 is a block diagram showing a configuration example of the control unit 302. The first input buffer 350 and the second input buffer 352 receive the first control signal Sig1 and the second control signal Sig2, respectively. A first pulse detector 354 determines whether the first control signal Sig1 is a pulse signal or a non-pulse signal, and generates a first determination signal $S_{31}$ that has a first level (for example, HIGH) in the case of a pulse signal and that has a second level (LOW) in the case of a non-pulse signal. That is, the first pulse detector 354 determines whether edges of the first control signal Sig1 are input with a predetermined period (for example, 200 Hz).

A light control circuit 370 generates a signal $V_{SS}$ that specifies the target value $I_{REF}$ of the drive current $I_{OUT}$ of the switching converter 312. An output buffer 380 generates the target value $I_{REF}$ of the drive current $I_{OUT}$ depending on the signal $V_{SS}$.

The light control circuit 370, which includes a gradual lighting-extinguishing circuit, gently increases the signal $V_{SS}$ at the start of lighting and gently decreases the signal $V_{SS}$ at the time of extinguishing, in the first lighting mode. For example, the light control circuit 370 may include a capacitor 372, a charge circuit 374 and a discharge circuit 376. The charge circuit 374 and the discharge circuit 376 are shown as symbols for current sources, but constituents of the charge circuit 374 and the discharge circuit 376 are not limited, and may be resistors or switches.

When the first determination signal $S_{31}$ has the LOW level, the first determination signal $S_{31}$ is supplied to at least one block of the control unit 302, such that the target current $I_{REF}$ becomes zero. For example, the first determination signal $S_{31}$ may be supplied to the light control circuit 370, and the light control circuit 370 may adjust the signal $V_{SS}$ to zero when the first determination signal S31 has the LOW level.

A second pulse detector 356 determines whether the second control signal Sig2 is a pulse signal or a non-pulse signal, and generates a determination signal $S_{32}$ indicating the determination result. The determination signal $S_{32}$ is used for the control of the protective switch 318 in FIG. 2. When the second control signal Sig2 is a pulse signal, the determination signal $S_{32}$ has the HIGH level, and the protective switch 318 is turned on. When the second control signal Sig2 is a non-pulse signal, the determination signal $S_{32}$ has the LOW level, the protective switch 318 is turned off, and the extinguishing mode is selected.

For example, the pulse detectors 354, 356 can be constituted by one-shot multivibrators that can be triggered multiple times, but the disclosure is not limited to this.

A smoothing circuit 358 is a low pass filter that smooths the first control signal Sig1, and generates a detection voltage $V_{DUTY1}$ corresponding to the duty ratio of the first control signal Sig1. The smoothing circuit 358, which is configured to be turned on or off depending on the first determination signal $S_{31}$, generates the detection voltage $V_{DUTY1}$ when the first determination signal $S_{31}$ has the HIGH level, and adjusts the detection voltage $V_{DUTY1}$ to zero when the first determination signal $S_{31}$ has the LOW level.

First comparator COMP1 to third comparator COMP3 compare the detection voltage $V_{DUTY1}$ to thresholds $V_{80\%}$, $V_{40\%}$, $V_{20\%}$, and determines whether the duty ratio of the first control signal Sig1 is contained in a range of 0 to 20%, a range of 20 to 40%, a range of 40 to 80% or a range of 80 to 100%. An output $S_{41}$ of the first comparator COMP1 has the HIGH level in the case of $V_{DUTY1}>V_{80\%}$. An output $S_{42}$ of the second comparator COMP2 has the HIGH level in the case of $V_{DUTY1}>V_{40\%}$. The third comparator COMP3 has an inverse logic, and an output $S_{43}$ of the third comparator COMP3 has the HIGH level in the case of $V_{DUTY1}<V_{20\%}$.

In the following, an operation of the control unit 302 will be described for each range of the duty ratio Duty of the first control signal Sig1.

0%<Duty≤20% (Third Lighting Mode) In this case, the output signal $S_{43}$ of the third comparator COMP3 has the HIGH level. The signal $S_{43}$ acts on the charge circuit 374 of the light control circuit 370, and decreases charge current amount to the capacitor 372. Thereby, the increasing rate of the voltage $V_{SS}$ decreases.

20%<Duty≤40% (Second Lighting Mode) Both of the output signals $S_{42}$, $S_{43}$ of the second comparator COMP2, the third comparator COMP3 have the LOW level. When both of the signals $S_{42}$, $S_{43}$ have the LOW level, a logic gate 364 turns the first switch 362 on. The logic gate 364 may be a NOR gate.

A filter 360 smooths an output of the second input buffer 352. An output of the filter 360 acts on an input of the buffer 380 through a resistor $R_{61}$. When the duty ratio of the second control signal Sig2 is a certain value of 80% or more, an output of the filter 360 has the HIGH level. In this state, the output of the filter 360 does not influence on the input of the buffer 380, and the target value $I_{REF}$ depends on the output $V_{SS}$ of the light control circuit 370.

When the duty ratio of the second control signal Sig2 is a certain value of 20% or less, the output of the filter 360 has the LOW level. Since $R_{61}<R_{62}$ is satisfied, as the input voltage of the buffer 380, the output of the filter 360 having the LOW level takes priority over the output signal $V_{SS}$ of the light control circuit 370. As a result, the target value $I_{REF}$, which is the output of the buffer 380, becomes zero, and the light source 202 is extinguished.

When the duty ratio of the second control signal Sig2 is changed between Duty1 (<20%) and Duty2 (>80%) with a predetermined period, the output of the filter 360 gently goes and returns between the LOW level the HIGH level. As a result, it is possible to blink the light source 202.

40%<Duty≤80% (First Lighting Mode) The output $S_{42}$ of the second comparator COMP2 has the HIGH level. Thereby, the solenoid drive circuit 316 is activated, and the actuator 206 is energized, resulting in the first lighting mode.

80%<Duty (Instant Extinguishing) The output $S_{41}$ of the first comparator COMP1 has the HIGH level. Thereby, the second switch 378 is turned on, and the output $V_{SS}$ of the light control circuit 370 instantly becomes zero, so that the light source 202 is extinguished.

Persons skilled in the art understand that the configuration of the control unit 302 is not limited to that in FIG. 7 and there are various modifications. For example, the control unit 302 may be configured as a digital circuit, or the same function may be realized by a software control.

The disclosure has been described above, based on the embodiment. Persons skilled in the art understand that the embodiment is an example, various modifications can be made as combinations of the constituent elements and the processes, and such modifications are included in the scope of the disclosure. In the following, such modifications will be described.

The combination of a plurality of lighting modes is not to limited to the combination described in the embodiment. When there are a plurality of lighting modes in a light source unit for a low beam and an ordinary high beam, the above-described technology can be applied to the control of the light source unit.

The disclosure has been described using specific words and phrases, based on the embodiment. The embodiment merely shows a principle and application of the disclosure. In the embodiment, many modifications and arrangement changes can be made without departing from the idea of the disclosure specified by the claims.

What is claimed is:

1. A lighting circuit for controlling a light source unit that is used in a vehicle lighting device, the lighting circuit comprising:
    a control unit configured to receive a first control signal and a second control signal through two control lines and select one of an extinguishing mode and a plurality of lighting modes based on the first control signal and the second control signal; and
    a drive unit configured to drive the light source unit in accordance with the mode selected by the control unit, wherein the control unit is configured to
    i) select the extinguishing mode when at least one of the first control signal and the second control signal is a non-pulse signal, and
    ii) select one of the plurality of lighting modes based on a combination of a duty ratio of the first control signal and a duty ratio of the second control signal, when both the first control signal and the second control signal are pulse signals.

2. The lighting circuit according to claim 1, wherein the control unit is configured to select a first lighting mode when the duty ratio of the first control signal is contained in a first range, and select a second lighting mode when the duty ratio of the first control signal is contained in a second range.

3. The lighting circuit according to claim 2, wherein:
    the light source unit includes a light source and an actuator; and
    a state of the actuator is different between the first lighting mode and the second lighting mode.

4. The lighting circuit according to claim 2, wherein in the second lighting mode, the light source is lighted when the duty ratio of the second control signal is contained in a first range, and the light source is extinguished when the duty ratio of the second control signal is contained in a second range.

5. The lighting circuit according to claim 4, wherein:
    in the first lighting mode, the drive unit is configured to gradually light or gradually extinguish the light source; and
    the drive unit is configured to instantly extinguish the light source when the duty ratio of the first control signal is contained in a third range adjacent to the first range.

6. The lighting circuit according to claim 5, wherein:
    the plurality of lighting modes include a third lighting mode;
    the control unit is configured to select the third lighting mode when the duty ratio of the first control signal is contained in a fourth range; and
    the drive unit is configured to light the light source in the third lighting mode, at a lower speed than in the first lighting mode.

7. The lighting circuit according to claim 1, wherein:
    the drive unit includes a switching converter that supplies a drive current to the light source of the light source unit and a protective switch that is provided on a pathway of the drive current; and
    the control unit is configured to change a command value of the drive current and extinguish the light source when the first control signal is a non-pulse signal, and turn the protective switch off when the second control signal is a non-pulse signal.

8. A vehicle lighting device characterized by comprising:
    a light source unit that includes a light source; and
    the lighting circuit according to claim 1, the lighting circuit driving the light source unit.

* * * * *